Aug. 27, 1929.  E. L. DELANY  1,726,016
FLUSH VALVE FLOAT
Filed March 7, 1927
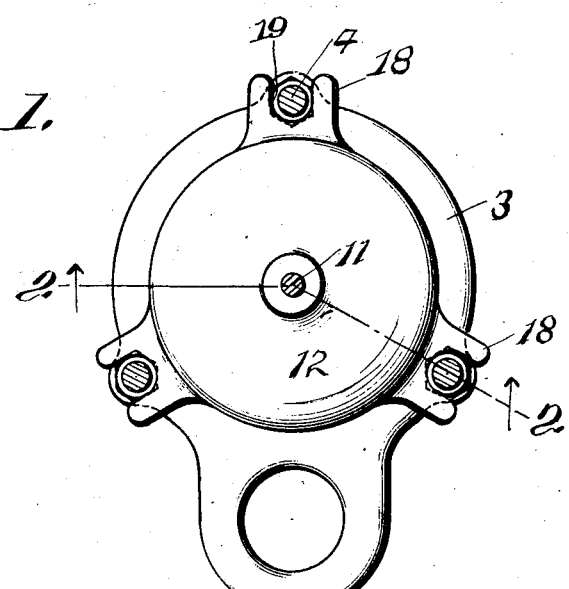
Fig. 1.
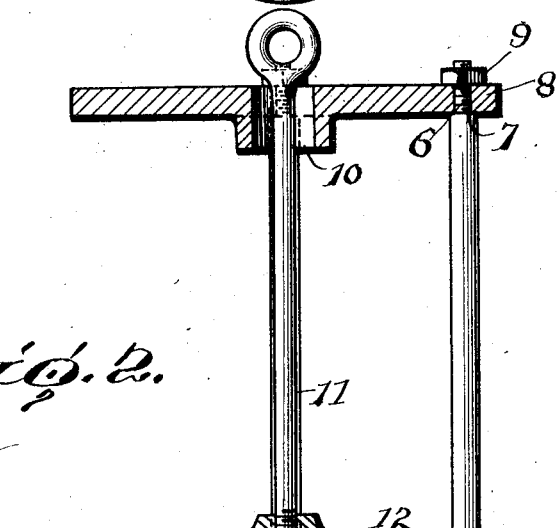
Fig. 2.
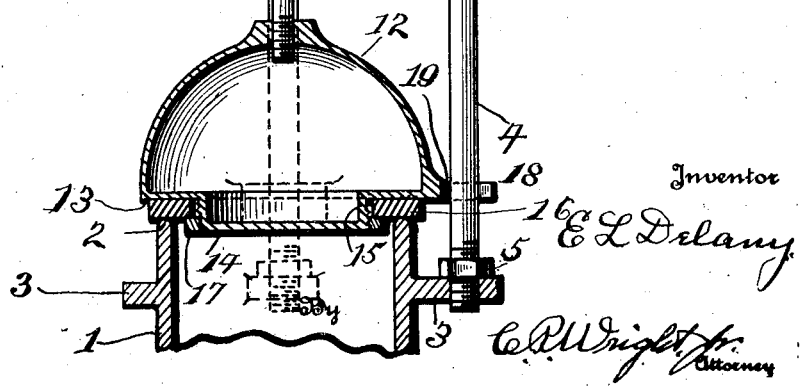
Inventor
E L Delany
C. R. Wright Jr.
Attorney Patented Aug. 27, 1929.

1,726,016

UNITED STATES PATENT OFFICE.

EDWARD L. DELANY, OF BROOKLYN, NEW YORK.

FLUSH-VALVE FLOAT.

Application filed March 7, 1927. Serial No. 173,542.

My invention relates to improvements in flush valve floats.

The object of my invention is to provide a composition flush valve float having a flat horizontal seating surface and integrally molded guide ears, whereby the seating surface is guided to the valve seat to insure of the proper seating of the seating surface on the valve seat.

Another object of my invention is to provide a flush valve float of this character in which the flat horizontal seating surface can be readily removed and replaced, and also providing means whereby the entire flush valve float can be readily removed and a new float substituted therefor.

A further object of my invention is to provide a simple, cheap and effective composition flush valve float having certain details of structure and combination of parts hereinafter more fully set forth:

In the accompanying drawings:—

Figure 1 is a top plan view of a flush valve showing my improved float applied thereto.

Figure 2 is a vertical sectional view taken on the line 2—2 of Figure 1.

Referring now to the drawings, 1 represents the flush outlet of a tank which is provided with a raised valve seat 2, and around the same below the valve seat is arranged the flange 3 which carries the three upwardly extending guide rods 4, which are preferably screwed into the flange 3 and locked therein by the lock nuts 5. The upper ends of the guide rods 4 are reduced and screw threaded as indicated at 6, forming the shoulders 7 upon which rests the plate 8 and through which the threaded portion 6 of the guide rods 4 pass. The plate 8 is locked upon the guide rods by nut 9. By this structure it will be seen that the plate 8 is removable for removing the flush valve float, and will be hereinafter more fully described.

The plate 8 is provided with a central opening 10 through which the lifting rod 11 of the flush valve float 12 passes, and the lifting rod 11 is screwed into the flush valve float in the ordinary manner, as is well understood by those skilled in the art. The flush valve float 12 is preferably made of soft rubber and vulcanized in the usual manner. The lower end of the flush valve float has a horizontal flat face 13 around its outer periphery and the reduced central portion 14 having its vertical wall screw threaded as indicated at 15. Surrounding the vertical wall of the threaded portion 15 of the extension 14 is a composition gasket or seating element 16, which is locked in position by means of the nut 17, screwed on the threads 15.

The flush valve float 12 has formed integral therewith the outwardly extending ears 18, which as shown in Figure 1 of the drawings, are arranged in pairs forming the spaces 19 between the ears and in which are arranged the guide rods 4. While I have shown three guide rods and three pairs of ears it will be understood that any desired number of rods or guide ears can be provided. These ears as shown are above the composition gasket or seating element.

From the foregoing description it will be seen that I have provided a flush valve float made of a composition preferably of vulcanized rubber and provided with integral outwardly extending ears forming guides for the rods, whereby the valve is caused to properly seat itself upon the seat 2, whereby a tight connection is made between the seat 2 and the gasket or washer 16. As heretofore stated, when it is desired to replace any of the parts of the flush valve float or to place a new float it is only necessary to remove the nuts 9 from the guide rods 4, and the plate 8 together with the flush valve float can be lifted upwardly from between the guide rods 4. Any repairs can then be made by the replacement of a new washer, or the replacement of an entire flush valve float.

Having thus fully described my invention what I claim is:—

1. A flush valve float comprising a hollow body portion having integral spaced guiding means formed around its periphery above a seating element and having guiding grooves in their outer walls adapted to cooperate with guides carried by a valve seat.

2. A flush valve float comprising a hollow body portion having a flat horizontal lower face, means for attaching a soft seating element thereto, and an outwardly extending guiding means formed integral with the float above the seating element and having guiding grooves in its outer face adapted to cooperate with guide rods carried by the valve seat.

3. A flush valve float comprising a hollow body portion having a flat horizontal end provided with a reduced extension, a soft rubber seating element surrounding the reduced portion and resting against the flat lower end, a nut threaded on the reduced portion and clamping the soft seating element to the float and integral outwardly extending ears in a plane with the flat horizontal lower face of the valve.

4. The combination with a flush outlet, of a flush tank and its seat, of rods carried by the flush outlet, a flush valve float having a flat horizontal seating element adapted to cooperate with the seat of the overflow, and having integral outwardly extending guiding means cooperating with the guide rods.

5. The combination with the flush outlet, of a flush tank and its seat, of rods carried by the outlet and surrounding the seat, a removable plate carried by the upper end of the rods and having a central opening therethrough, a flush valve float lifting rod passing through the opening, a flush valve float carried by the lower end of the lifting rod and having a flat horizontal lower end, a soft seating element carried by the flat lower end of the flush valve float and removably secured thereto, and integral ears carried by the lower end of the flush valve float above the seating element and straddling the rods for guiding the flush valve float to its seat.

In testimony whereof, I have signed this specification.

EDWARD L. DELANY.